Sept. 21, 1926.  
D. J. O'CONNOR  
PIPE JOINT  
Filed May 10, 1926
1,600,561
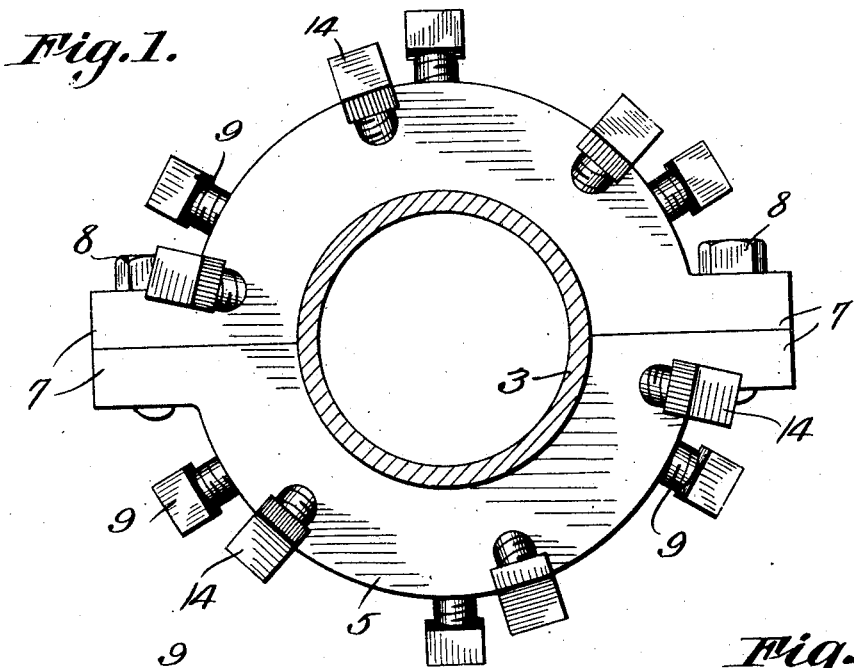
Fig. 1.
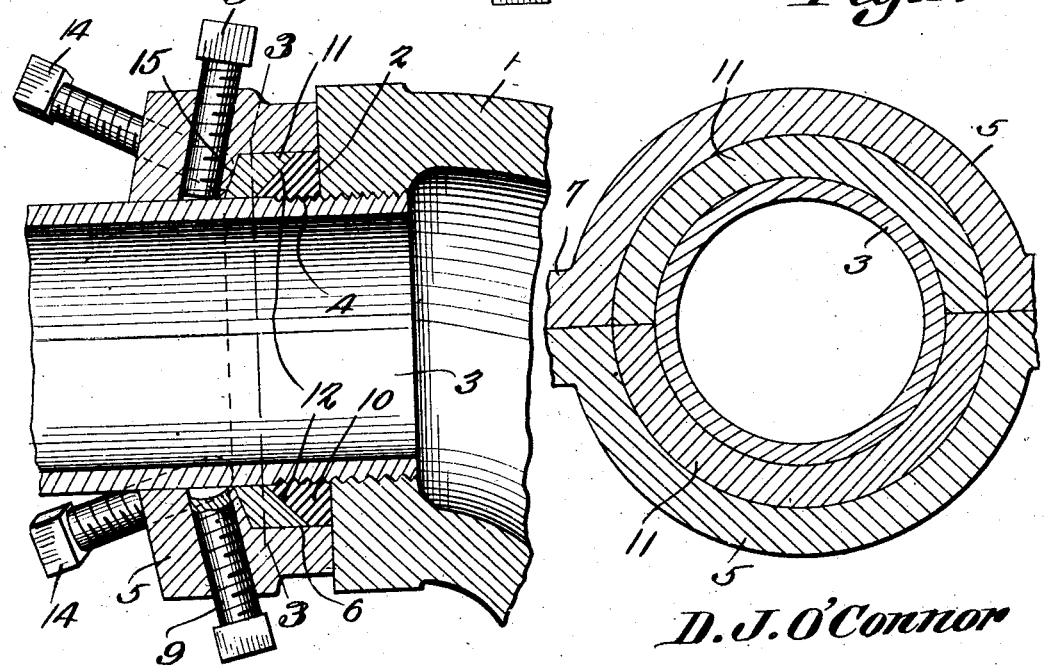
Fig. 2.
Fig. 3.
D. J. O'Connor  
Inventor,  
By C. A. Snow & Co.  
Attorneys.

Patented Sept. 21, 1926.

1,600,561

UNITED STATES PATENT OFFICE.

DANIEL J. O'CONNOR, OF LOUISVILLE, KENTUCKY.

PIPE JOINT.

Application filed May 10, 1926. Serial No. 108,043.

By way of explanation it may be stated that when one pipe is threaded into another, a portion of the external threads on the first-specified pipe almost always are exposed, and the present invention aims to provide novel means for sealing the exposed threads under a condition of the kind mentioned.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 is an end elevation wherein one pipe appears in section;

Figure 2 is a longitudinal section;

Figure 3 is a cross section taken about on the line 3—3 of Figure 2.

The numeral 1 marks a pipe or similar member, the end of which forms a shoulder 2. A pipe 3 is threaded into the pipe 1 and part of the threads generally are disposed as shown at 4. A collar 5 is disposed about the pipe 3 and has an internal recess 6. The collar 5 consists of separable parts having outstanding flanges 7 connected by bolts 8, or in any other suitable way. Set screws 9 are threaded into the collar 5 and engage the pipe 3. The set screws 9 are disposed at an acute angle to the axis of the pipe 3, whereby, when they are tightened, they will force the collar 5 against the shoulder 2 and then fasten the collar to the pipe 3. A packing 10 is located in the recess 6 and abuts against the shoulder, the packing being resilient. The packing 10 surrounds the exposed threads 4 of the pipe 3. A divided ring 11 is located in the recess 6 and engages the packing 10. The engaged surfaces 12 of the packing 10 and of the ring 11 are disposed at an acute angle to the axis of the pipe 3, whereby when the ring 11 is advanced, the packing 10 will be forced against the shoulder 2 and also into the exposed threads 4 of the pipe 3. Set screws 14 are threaded into the end of the collar 5 and bears on the end surface 15 of the ring 11. The set screws 14 are disposed at such an angle with respect to the axis of the pipe 3 that they will tend to force the ring and the packing both toward the shoulder 2 and inwardly toward the axis of the pipe 3.

The results flowing from the entire structure above described are that the exposed threads 4 will be sealed adequately, and with a thoroughness not possible with any other pipe device in the art.

What is claimed is:—

The combination with a member the end of which forms a shoulder, and a pipe threaded into said member and having threads exposed outwardly of the shoulder, of a collar about the pipe and having an internal recess, set screws threaded into the collar and engaging the pipe, the set screws being disposed at an acute angle to the axis of the pipe whereby when they are tightened they will force the collar against the shoulder and then fasten the collar to the pipe, a packing within the recess and abutting against the shoulder, the packing surrounding the exposed threads of the pipe, a ring in the recess and engaging the packing, the engaged surfaces of the packing and of the ring being disposed at an acute angle to the axis of the pipe whereby when the ring is advanced, the packing will be forced against the shoulder and also into the exposed threads of the pipe, and set screws threaded into the collar and bearing on the end surface of the ring, the last-specified set screws being disposed at such an angle with respect to the axis of the pipe that they will tend to force the ring and the packing both toward the shoulder and inwardly toward the axis of the pipe.

In testimony that I claim the foregoing as my own, I have hereto affixed my signature.

DANIEL J. O'CONNOR.